R. E. GREENE.
DELIVERY VEHICLE BODY.
APPLICATION FILED APR. 24, 1916.

1,204,271.

Patented Nov. 7, 1916.
4 SHEETS—SHEET 1.

Inventor
R. E. Greene
Attorney

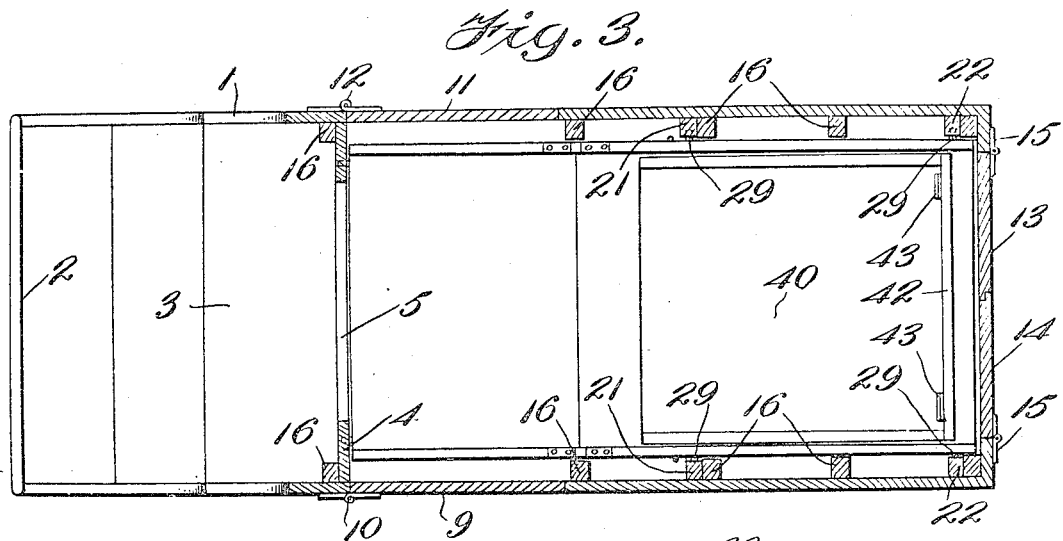
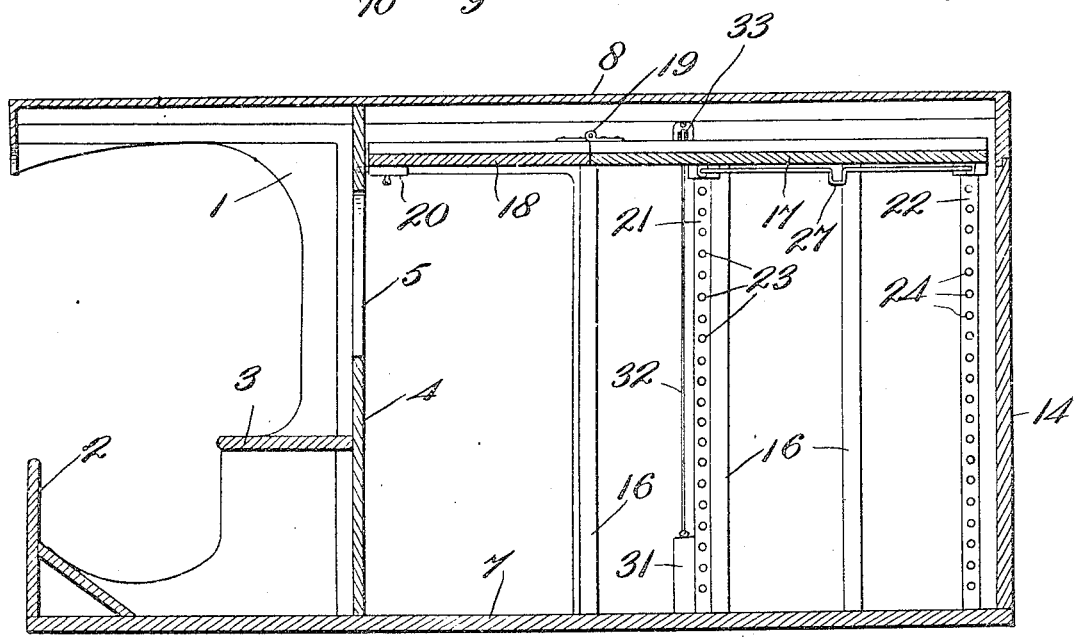

R. E. GREENE.
DELIVERY VEHICLE BODY.
APPLICATION FILED APR. 24, 1916.

1,204,271.

Patented Nov. 7, 1916.
4 SHEETS—SHEET 3.

Inventor
R. E. Greene by
Attorney

R. E. GREENE.
DELIVERY VEHICLE BODY.
APPLICATION FILED APR. 24, 1916.
1,204,271.
Patented Nov. 7, 1916.
4 SHEETS—SHEET 4.
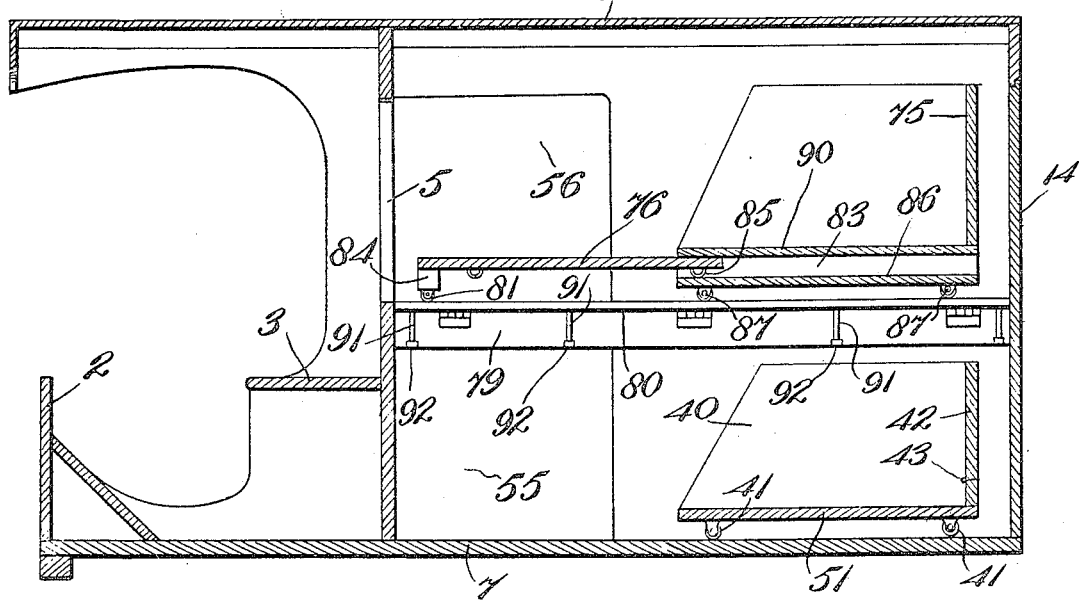
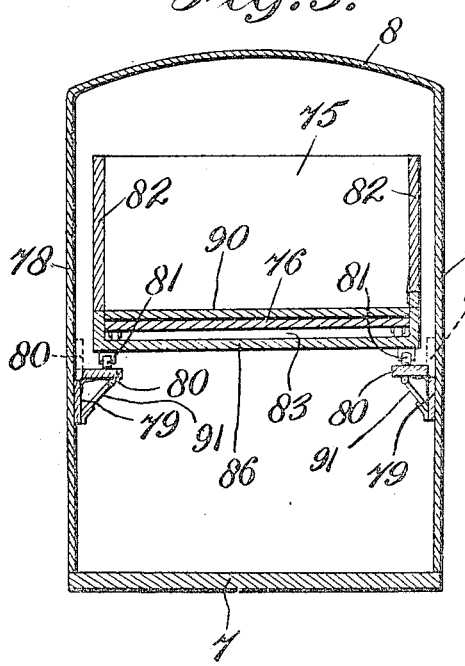
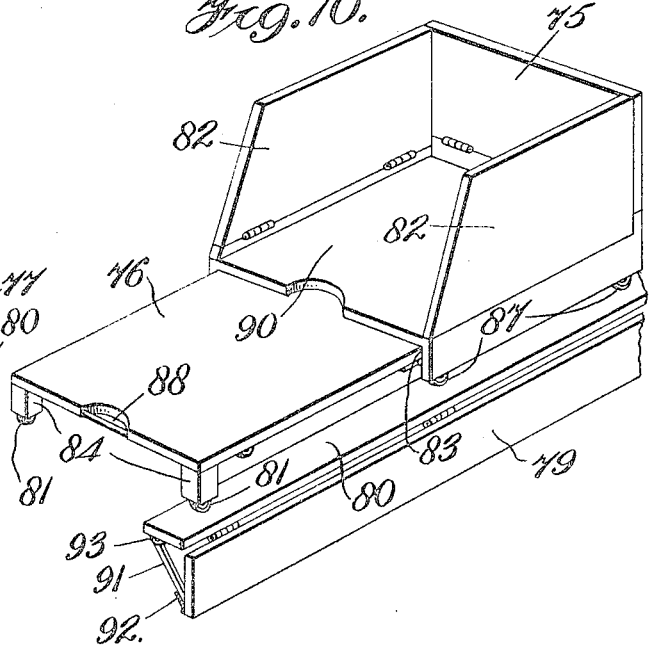
Inventor
R. E. Greene by
Attorney

UNITED STATES PATENT OFFICE.

ROBERT E. GREENE, OF MEMPHIS, TENNESSEE.

DELIVERY VEHICLE-BODY.

1,204,271.

Specification of Letters Patent. Patented Nov. 7, 1916.

Application filed April 24, 1916. Serial No. 93,269.

*To all whom it may concern:*

Be it known that I, ROBERT E. GREENE, a citizen of the United States, residing at Memphis, in the county of Shelby and State of Tennessee, have invented certain new and useful Improvements in Delivery Vehicle-Bodies; and I do hereby declare the following to be a full, clear, and exact description of the invention, such as will enable others skilled in the art to which it appertains to make and use the same.

This invention relates to delivery wagon or car bodies and has for its object to provide a body which will be comparatively inexpensive to construct and more efficient in operation than those heretofore proposed.

With these and other objects in view, the invention consists in the novel details of construction and combinations of parts more fully hereinafter disclosed and particularly pointed out in the claims.

Figure 1:
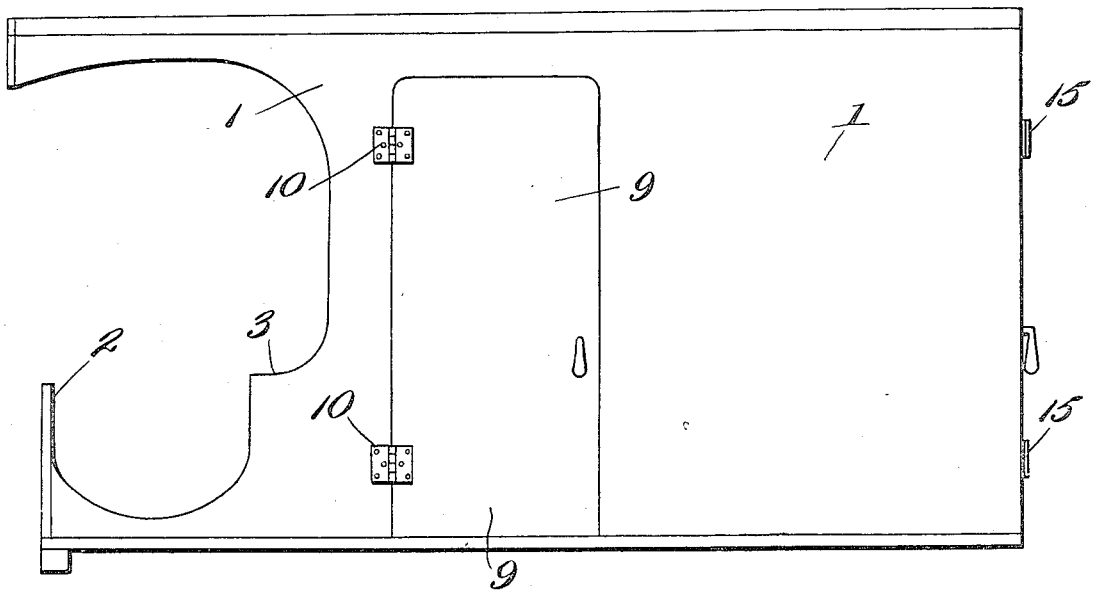
Figure 2:
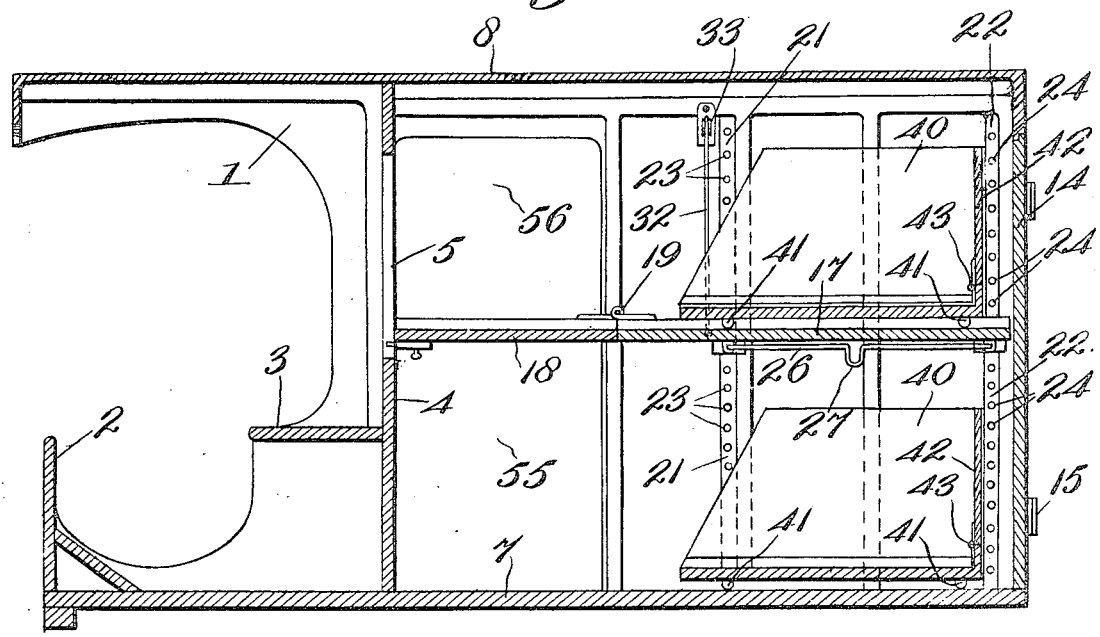
Figure 5:
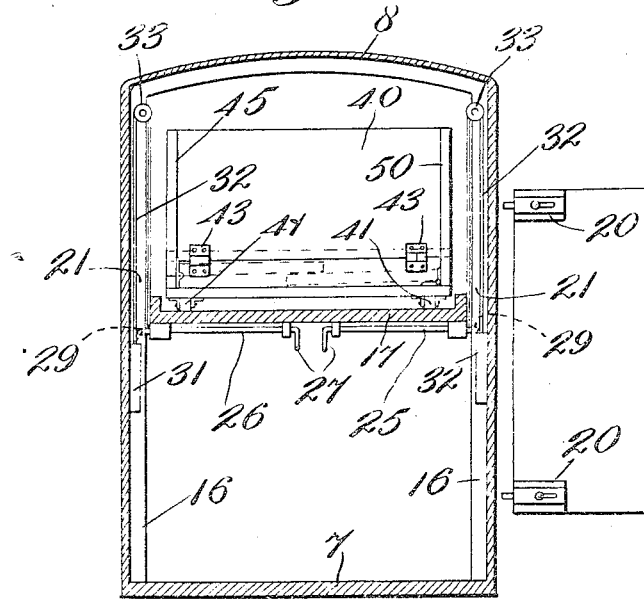
Figure 6:
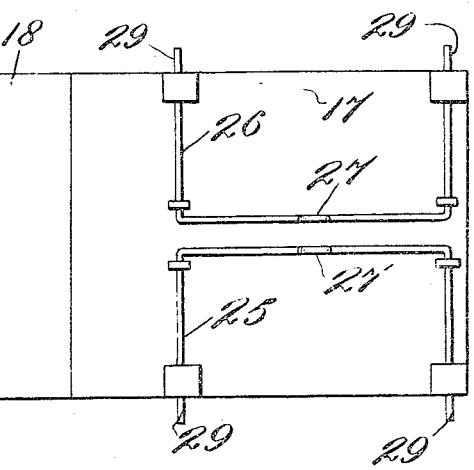
Figure 7:
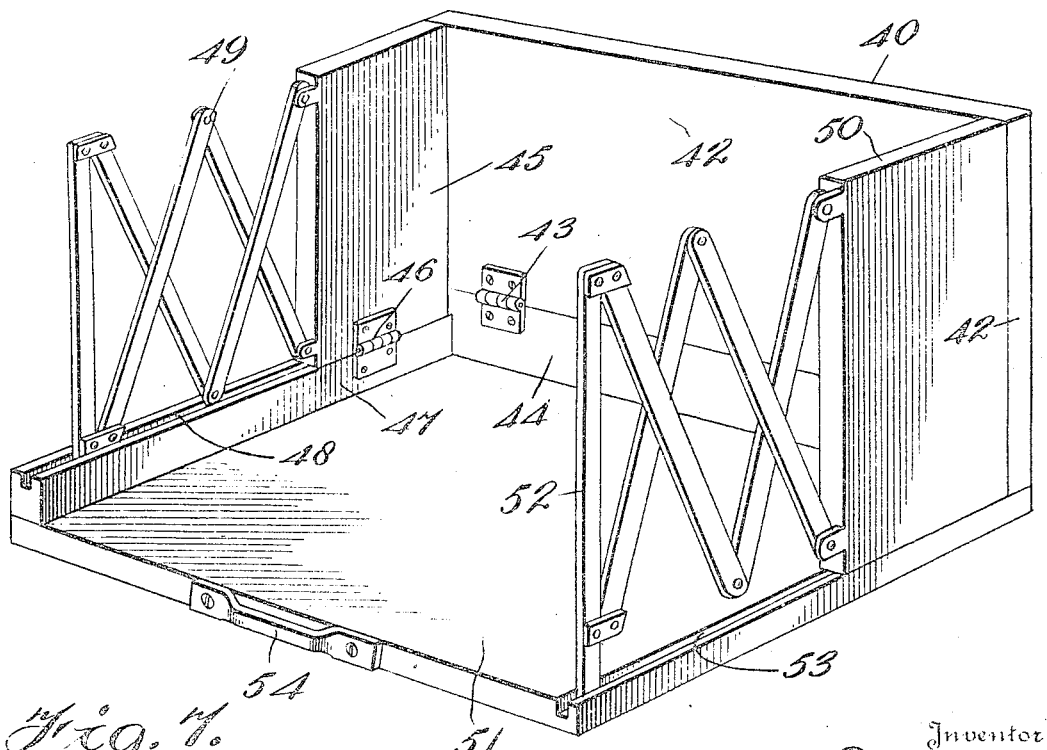

Referring to the accompanying drawings forming a part of this specification, in which like numerals designate like parts in all the views: Figure 1 is a side elevational view of a delivery wagon or car body made in accordance with this invention; Fig. 2 is a longitudinal sectional view in elevation of the parts shown in Fig. 1; Fig. 3 is a longitudinal sectional plan view of the parts shown in Fig. 1; Fig. 4 is a view similar to Fig. 2 but showing the middle partition or movable bottom raised up out of the way; Fig. 5 is a transverse sectional elevational view of the parts shown in Fig. 1; Fig. 6 is a bottom plan view of the movable bottom detached from the bar body; Fig. 7 is an enlarged perspective view of one of the movable trays or receptacles used in moving the goods from the rear to the front of the body; Fig. 8 is a view similar to Fig. 2, but showing a modified form of the invention; Fig. 9 is a transverse sectional view of the construction shown in Fig. 8; and Fig. 10 is a perspective view showing the combined receptacle and partition or movable bottom.

Referring to Figs. 1 to 7 inclusive: 1 indicates any suitable wagon or car body, but preferably of a form suitable for automobile delivery trucks, 2 the dash-board thereof, 3 the seat for the driver, 4 a transverse partition or wall back of the driver's seat provided with the opening 5 through which the driver may reach in order to seize the parcels for the purpose of delivery, 7 the ordinary bottom of the vehicle body, 8 the top thereof, 9 one of the side doors with which the body is provided hinged at 10, and 11 another side door for said body hinged as at 12 to the side walls thereof. It is preferable to have the side doors 9 and 11 open toward the front of the body instead of toward the rear as by this means all danger of striking the rear wheels, (not shown) is obviated. The body 1 is also preferably provided with the rear doors 13 and 14 hinged as at 15, and also with the vertically disposed standards 16 spaced apart as illustrated. Inside the body 1 and preferably extending from the front wall or partition 4 to the rear doors 13 and 14, is the movable horizontally disposed partition or adjustable bottom 17 preferably provided with the hinged member 18 secured to the main body portion by the hinge 19 and secured to the front wall 4 as by the spring catches 20. In order to adjustably hold this said false bottom 17 in any position to which it may be moved, I preferably further provide the extra vertical standards 21 and 22 and perforate these said standards with the holes 23 and 24 respectively. I further provide, as on the bottom portion of the bottom 17 the adjustable sliding bolt or locking members 25 and 26, having the bent-over handle portions 27, and preferably controlled by springs not shown. The projecting end portions 29 of said locking members are adapted to take in the holes 23 and 24 of the standards 21 and 22 and thereby securely support and lock the said movable bottom 17. In order to facilitate the ready movement up and down of the said bottom 17, I may further provide it with counterweights 31 attached to the cords 32 passing over the pulleys 33 attached to the bottom 17, all as will be clear from Figs. 4 and 5. By thus employing the counterweights it is a comparatively easy matter to move the bottom 17 from the position illustrated in Fig. 2 to the position illustrated in Fig. 4, where it may be entirely out of the way, so as to accommodate large packages such as barrels of goods, in wholesale quantities. In the same way, the bottom 17 may be, if desired, adjusted all the way down until it substantially touches or contacts with the bottom 7 whereupon goods may be loaded on top of the same and extend substantially up to the cover 8 of the vehicle body.

40 represents a plurality of trays or receptacles adapted to readily move over the bottoms 7 and 17 from front to rear of the wagon car body and are preferably provided with the rollers 41 to facilitate such movement. All of these trays are preferably made of a knock-down structure so that they may be folded up and stored in as little space as possible. That is to say, the rear walls 42 of said trays are conveniently hinged as at 43 to the rear ledge 44 while the side walls 45 may be hinged as at 46 to the side ledges 47, and said side ledges are preferably grooved as at 48 to accommodate the lazytongs or other extension 49 of the said side walls 45. In addition to the side walls 45 the said trays may be provided with similar side walls 50 fitted to the bottom 51 of said trays in any suitable manner and provided with the lazytongs extension 52 fitting in grooves such as 53. 54 represents convenient handles to facilitate the ready movement backward and forward of the said trays 40. It will thus be seen that in order to knock down the tray and pack it in a small space it is only necessary to fold in the wall 50 so that said wall and its companion lazytongs 52 will lie snugly on the bottom 51 whereupon the ledge 47 which rises to a height substantially equal to the thickness of the side wall 50 will cause the side wall 45, when folded inwardly to lie snugly on top of said side walls 50. When the two side walls are thus folded upon each other, the ledge 44 which extends upwardly from the bottom to a distance substantially equal to the thickness of the two side walls 45 and 50, will cause the rear wall 42, when folded over, to lie snugly against the said folded side walls 45 and 50, all as will be clear from the dotted line positions indicated in Fig. 5.

The operation of my improved vehicle delivery body illustrated in Figs. 1 to 7 inclusive is as follows: The adjustable false bottom 17 may be raised to its highest position illustrated in Fig. 4 or it may be lowered to contact with the bottom 7, and the vehicle body can then be used similarly to any ordinary body, in that it can receive both wholesale and retail parcels. When it is desired, however, to deliver a large number of small parcels, the said parcels that are to be last delivered are conveniently loaded into the trays or receptacles 40 and these said receptacles may be conveniently introduced through the rear doors 14 or through the side doors 9, or even through the opening 5 provided the section 18 is lifted on the hinge 19 to accommodate the lower tray 40. Ordinarily it will be most convenient to introduce the trays through the rear doors. The parcels to be first delivered are then loaded in through the side doors 9 and 11 to occupy the spaces 55 and 56 or said parcels may be loaded in through both the side doors 9 and 11 and the opening 5, the hinged section 18 of the bottom 17 being moved up out of the way as by turning on the hinge 19, in order to reach the lower space 55. The parcels being thus introduced into the vehicle body in the inverse order in which they are to be delivered, the rear and side doors may be permanently locked so that the contents of the body will be safe from theft and the entire load may be delivered through the opening 5. That is to say, the driver need never leave his seat in order to get hold of a particular parcel and this being so, he can always drive up to the side walk and move, with parcel in hand, from the vehicle body to the pavement and walk into the house without having to go into the mud as is the ordinary case. By this means he is enabled to avoid the tracking up of the floors of residences with muddy feet which is now found so objectionable in the usual delivery system. In addition to the above, considerable time is saved in that he can always turn around in his seat and select the identical parcel he needs while consulting his book and thus save time as well as prevent soiling his book and getting wet in rainy weather, which now occurs in having to leave the vehicle and stand in the mud to select the proper parcel from the rear. After the driver delivers all of the parcels from the top of the hinged member 18, for example, he may then, provided the wagon has been properly loaded for this procedure, reach to the rear and pull the upper tray 40 forward until it occupies the top of said hinged section 18 and continue to deliver from said upper tray 40 while in this position, as all of the parcels will be within easy reach. On the other hand, if the parcels were loaded in such an order as to demand that the space 55 be emptied immediately after the space 56, the driver merely lifts the section 18 on the hinge 19 and proceeds to empty the said space 55 in its regular order. The spaces 55 and 56 being thus emptied, then the upper or lower tray 40 is brought forward according to the order in which they were loaded and the driver proceeds to empty them by reaching through the opening 5 and seizing the parcels as they are required. In all cases it will be seen that the driver does not have to leave his seat in order to obtain possession of the proper parcel nor does he have to ever jump from his wagon to the mud in unpaved streets provided he can drive up to a pavement, and therefore, he is assured of having clean feet to enter residences. In any case where the parcels are too large to be accommodated under the partition or false bottom 17, they may be either placed above said partition or said partition may be raised to accommodate said parcels.

Referring now to the modified form of construction illustrated in Figs. 8, 9 and 10, corresponding parts have been lettered with the same numerals as are found in the preceding figures, but a different form of removable receptacle 75 and movable bottom or partition 76 is employed. That is to say, the sides 77 and 78 of the vehicle are provided with the interior supports 79 to which may be conveniently hinged the transverse supports 80 extending a short distance inwardly and adapted to receive and support the rollers 81 of the receptacle 75 provided with the hinged side members 82 and with the raised or telescoping opening 83 into which may slide the adjustable partition or bottom 76, all as will be clear from the drawings. The said adjustable bottom 76 is conveniently provided with the offset 84 at its forward end to which are attached the rollers 81 and it is also provided at its rear end with the rollers 85 adapted to rest upon the bottom 86 of the telescopic passage 83. In addition to the above rollers the said receptacle 75 is provided with the rollers 87 adapted to rest upon the hinged supports 80 as shown. A catch or other hand grasping means 88 is conveniently provided at the forward edge of the partition or bottom 76, in order that it may be readily drawn out of the telescopic passage 83 into the position shown in Fig. 8, and in order that it may be likewise readily pushed back into said passage 83 as will be readily understood. The supports 79 and 80 may be permanently secured to the sides 77 and 78 of the vehicle or they may be vertically adjustable by any suitable means not shown.

The operation of the modified form of the invention illustrated in Figs. 8, 9 and 10 will be readily understood from the foregoing but may be briefly summarized as follows: Instead of lifting the hinged section 18 of the bottom illustrated in Fig. 2 when it is desired to reach the lower chamber 55, the driver merely forces back the said sliding bottom 76 into the passage 83, whereupon the said space 55 is readily reached and articles contained therein are readily delivered. When it is desired to pack articles in the space 56 above the said bottom 76, the latter is pulled out into the position illustrated in Figs. 8 and 10 whereupon packages are readily stored upon the same and delivered in the same way as described in connection with the said bottom member 18. When it is desired to do away with the bottom 76 and the bottom 90 of the receptacle 75, so as to permit the wagon to accommodate barrels and other wholesale packages it is only necessary to remove, bodily, the entire receptacles 42 and 75 and bottom 76 from the vehicle and to fold up the hinged supports 80 so that they will lie snugly against the sides 77 and 78 out of the way, as indicated in dotted lines in Fig. 9, whereupon the whole inside of the vehicle body will be available for the storage of packages. The said hinged supports 80 are conveniently secured in their folded up positions by any suitable means not shown. In order that the said hinged supports 80 may be enabled to securely hold the weight that is placed upon them, I provide at convenient intervals hinged supporting struts 91 which readily take into the pockets or supports 92 with which the members 79 are provided, and when the said members 80 are folded up as described above the said struts 91 will likewise turn on their hinges 93 and lie down parallel to the said members 79 and 80 out of the way, all as will be readily understood from the drawings.

It is obvious that those skilled in the art may vary the details of construction as well as the arrangement of parts without departing from the spirit of the invention, and therefore I do not wish to be limited to the above disclosure, except as may be required by the claims.

What I claim is:

1. In a delivery body for wheeled vehicles, the combination of a driver's seat; a horizontally disposed readily adjustable false bottom located in rear of said seat; said bottom having a hinged section near said seat; means for securing said bottom in various adjusted positions; and a receptacle of a less length than said bottom adapted to be readily moved backward and forward thereon, and a receptacle of less length than the unhinged portion of said bottom located beneath the same and adapted to be moved backward and forward in the vehicle body, substantially as described.

2. In a delivery body for wheeled vehicles the combination of a driver's seat; a door in the side of said vehicle; a horizontally disposed readily adjustable false bottom located in rear of said seat and adapted to be loaded from said door; said bottom having a hinged section near said seat; means for securing said bottom in various adjusted positions; and a receptacle of a less length than said bottom adapted to be readily moved backward and forward thereon, substantially as described.

3. In a delivery body for wheeled vehicles, provided with a side and a rear door, the combination of a driver's seat; a horizontally disposed readily adjustable false bottom located in rear of said seat and adapted to be loaded from said doors; said bottom having a hinged section near said seat; means for securing said bottom in various adjusted positions; and a receptacle of a less length than said bottom adapted to be readily moved backward and forward thereon, substantially as described.

In testimony whereof I affix my signature, in presence of two witnesses.

ROBERT E. GREENE.

Witnesses:
A. G. RENNOLON,
H. E. CRAFT.